US010539432B2

(12) United States Patent
Binder et al.

(10) Patent No.: US 10,539,432 B2
(45) Date of Patent: Jan. 21, 2020

(54) DIFFERENTIAL TOP-READ MAGNETIC SENSOR WITH LOW COST BACK BIAS MAGNET

(71) Applicant: Infineon Technologies AG, Neubiberg (DE)

(72) Inventors: Gernot Binder, Klagenfurt (AT); Armin Satz, Villach (AT)

(73) Assignee: Infineon Technologies AG, Neubiberg (DE)

( * ) Notice: Subject to any disclaimer, the term of this patent is extended or adjusted under 35 U.S.C. 154(b) by 146 days.

(21) Appl. No.: 15/882,437

(22) Filed: Jan. 29, 2018

(65) Prior Publication Data

US 2019/0234767 A1 Aug. 1, 2019

(51) Int. Cl.
*G01D 5/22* (2006.01)

(52) U.S. Cl.
CPC .................. *G01D 5/2216* (2013.01)

(58) Field of Classification Search
CPC ........ G01D 5/12–2525; G01B 7/14–15; G01R 33/02; G01R 33/06–098
See application file for complete search history.

(56) References Cited

U.S. PATENT DOCUMENTS

| 5,596,272 A | 1/1997 | Busch | |
|---|---|---|---|
| 5,814,985 A | 9/1998 | Oudet | |
| 7,030,606 B2* | 4/2006 | Kato | G01D 3/02 324/207.2 |
| 2001/0045827 A1 | 11/2001 | Shinjo et al. | |
| 2003/0222642 A1* | 12/2003 | Butzmann | G01D 5/147 324/207.21 |
| 2004/0174164 A1 | 9/2004 | Ao et al. | |
| 2006/0038557 A1* | 2/2006 | Johnson | G01D 5/145 324/207.25 |
| 2006/0261801 A1 | 11/2006 | Busch | |
| 2009/0326860 A1* | 12/2009 | Hainz | G01D 5/24452 702/163 |
| 2010/0060267 A1* | 3/2010 | Wagner | G01D 5/145 324/207.2 |
| 2010/0134095 A1* | 6/2010 | Loreit | G01D 5/147 324/207.2 |
| 2011/0101965 A1 | 5/2011 | Shimauchi et al. | |
| 2014/0232379 A1 | 8/2014 | Nazarian et al. | |

(Continued)

FOREIGN PATENT DOCUMENTS

WO        WO 95/18982        7/1995

*Primary Examiner* — Huy Q Phan
*Assistant Examiner* — David B Frederiksen
(74) *Attorney, Agent, or Firm* — Harrity & Harrity, LLP

(57) ABSTRACT

A sensor module may include a magnet with a magnetization in a first direction, and a sensor chip including a first sensing element and a second sensing element arranged on a plane defined by the sensor chip. The first direction may be substantially parallel to the main surface of the sensor chip. The first sensing element and the second sensing element may be sensitive to an in-plane component of a magnetic field along the first direction or may be sensitive to an in-plane component of the magnetic field perpendicular to the first direction. The first sensing element and the second sensing element may be positioned beyond an edge of the magnet along the first direction such that the first sensing element and the second sensing element protrude past the edge of the magnet along the first direction.

20 Claims, 10 Drawing Sheets

(56) References Cited

U.S. PATENT DOCUMENTS

2015/0022187 A1   1/2015  Taylor et al.
2015/0354984 A1*  12/2015  Albrecht ................ G01D 5/145
                                                          324/207.2
2016/0123771 A1   5/2016  David et al.

* cited by examiner

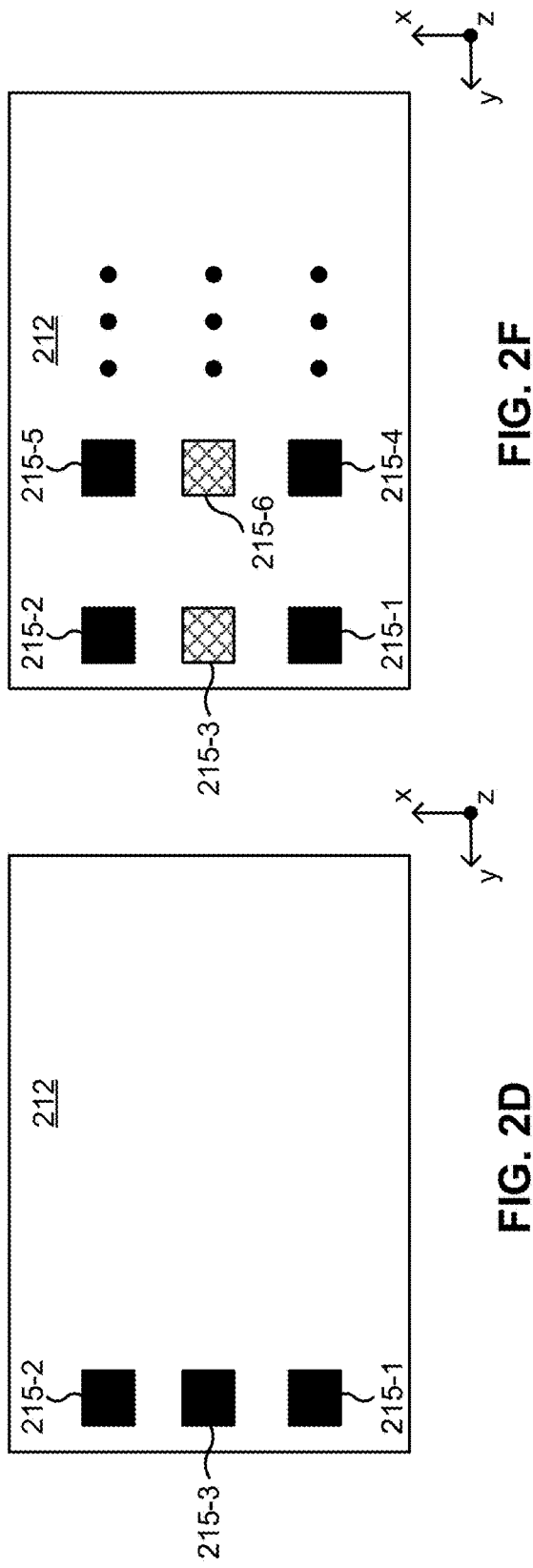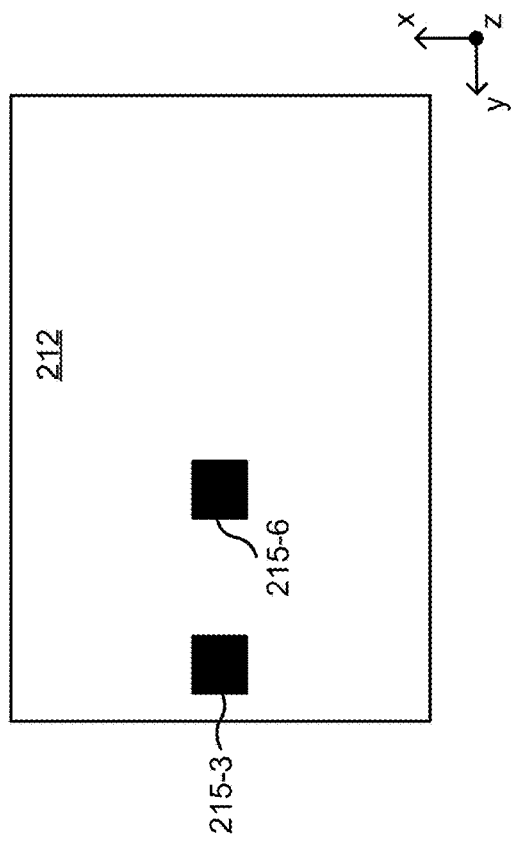

DIFFERENTIAL TOP-READ MAGNETIC SENSOR WITH LOW COST BACK BIAS MAGNET

BACKGROUND

A magnetic sensor may sense a magnetic field distorted by a tooth wheel attached to a rotating object. The magnetic sensor may output, based on the sensed magnetic field, a signal for use in identifying a rotational direction of the rotating object, a rotational speed of the rotating object, a rotational angle of the rotating object, and/or the like.

SUMMARY

According to some possible implementations, a sensor module may include: a magnet with a magnetization in a first direction; and a sensor chip including a first sensing element and a second sensing element arranged on a plane defined by the sensor chip, wherein the first direction is substantially parallel to the main surface of the sensor chip, wherein the first sensing element and the second sensing element are sensitive to an in-plane component of a magnetic field along the first direction or are sensitive to an in-plane component of the magnetic field perpendicular to the first direction, and wherein the first sensing element and the second sensing element are positioned beyond an edge of the magnet along the first direction such that the first sensing element and the second sensing element protrude past the edge of the magnet along the first direction.

According to some possible implementations, a sensor module may include: a magnet with a magnetization in a first direction; and a sensor chip including a first sensing element and a second sensing element arranged on a plane defined by the sensor chip, wherein the first direction is substantially parallel to the plane defined by the sensor chip, wherein the first sensing element and the second sensing element are sensitive to a component of a magnetic field along the first direction or are sensitive to a component of the magnetic field along a second direction that is substantially parallel to the plane defined by the sensor chip, wherein the second direction is substantially perpendicular to the first direction, and wherein at least one of the first sensing element or the second sensing element is positioned at or adjacent to an edge of the magnet along the first direction such that the first sensing element or the second sensing element protrudes past the edge of the magnet along the first direction.

According to some possible implementations, a sensor system may include: a magnetic sensor including a sensor chip with a plurality of sensing elements arranged on a plane defined by the sensor chip, wherein each of the plurality of sensing elements is sensitive to a component of a magnetic field along a first direction or is sensitive to a component of the magnetic field along a second direction, wherein the first direction and the second direction are substantially parallel to the plane defined by the sensor chip, and wherein the first direction is substantially perpendicular to the second direction, and wherein at least one of the plurality of sensing elements is to be positioned adjacent to an edge of a magnet, associated with the sensor system, along the first direction such that the at least one sensing element protrudes past the edge of the magnet along the first direction.

BRIEF DESCRIPTION OF THE DRAWINGS

FIGS. 2A-2F are diagrams associated with an example top-read magnetic sensor system, as described herein;

DETAILED DESCRIPTION

The following detailed description of example implementations refers to the accompanying drawings. The same reference numbers in different drawings may identify the same or similar elements.

As described above, a magnetic sensor may sense a magnetic field distorted by a tooth wheel, connected to a rotating object, in order to allow a property of the rotating object to be determined, such as a rotational direction, a rotational speed, a rotational angle, and/or the like. For example, in an automotive application, a ferromagnetic tooth wheel may be used in combination with a magnet and a magnetic sensor mounted on or near the magnet. Here, an output signal provided by the magnetic sensor (e.g., including pulses corresponding to teeth and gaps of the tooth wheel) may be used, by a control device (e.g., a microcontroller ($\mu C$), an electronic control unit (ECU), and/or the like) to determine the rotational speed, the rotational direction, and/or the rotational angle of the tooth wheel and, thus, the rotating object.

Figure 1:
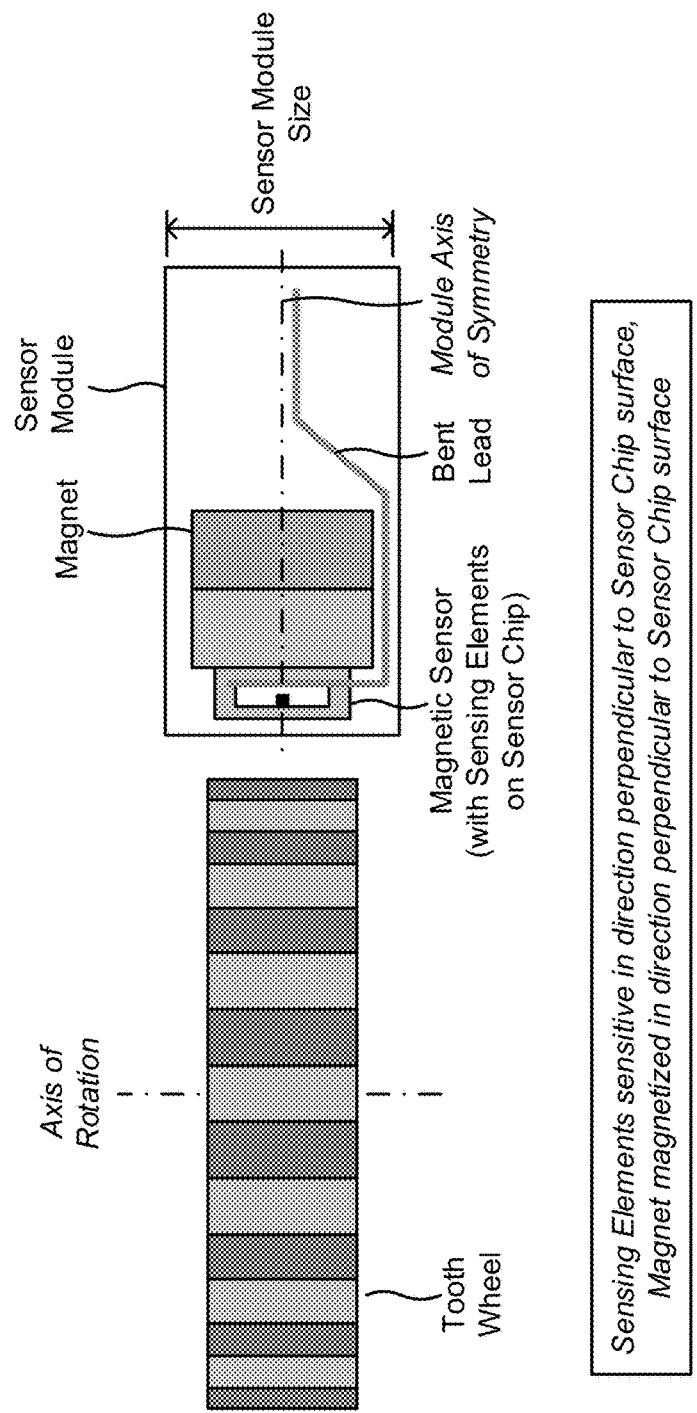
FIG. 1 is a diagram of a prior art magnetic sensor system.

FIG. 1 is a diagram of a prior art magnetic sensor system 100. As shown in FIG. 1, prior art magnetic sensor system 100 includes a tooth wheel (shown in a top view in FIG. 1, where lighter portions represent teeth and darker portions represent gaps) that rotates about an axis of rotation (e.g., an axis passing through a center of the tooth wheel). As further shown, prior art magnetic sensor system 100 includes a sensor module comprising a magnetic sensor (e.g., a sensor package including one or more sensing elements on a sensor chip), a magnet (e.g., on which the magnetic sensor is mounted), and a lead (e.g., connecting the sensor chip to a control device (not shown)) via which the magnetic sensor can provide an output signal and/or receive an input signal (e.g., a signal provided by the control device).

As shown in FIG. 1, in prior art magnetic sensor system 100, the magnetic sensor is arranged such that a surface on which the sensing elements are arranged (herein referred to as a main surface of the sensor chip) faces the tooth wheel. As noted in FIG. 1, the sensing elements in prior art magnetic sensor system 100 are sensitive to a component of a magnetic field in a direction that is perpendicular to the surface of the sensor chip (e.g., a direction that is parallel to a module axis of symmetry shown in FIG. 1). As further noted, the magnet is magnetized in the direction that is perpendicular to the main surface of the sensor chip (e.g., the magnet is an axial magnet in FIG. 1). In operation, the rotating tooth wheel distorts a magnetic field, produced by the magnet, such that a strength of the component of the magnetic field in the direction of sensitivity of the sensing elements is representative of the tooth wheel during rotation. The magnetic sensor provides, to the control device and via the lead, an output signal from which the rotational speed, the rotational direction, and/or the rotational angle can be determined.

However, as illustrated in FIG. 1, the lead is required to bend around the magnet in prior art magnetic sensor system 100 (e.g., in order to connect the lead to the control device). This bent lead requires an additional process step during assembly of the sensor module, thereby adding additional cost, complexity, and assembly time to prior art magnetic sensor system 100.

As further shown in FIG. 1, the bent lead and a size of the magnet contribute to a required overall size of the sensor module (e.g., since a size of the sensor module needs to be sufficient to house the magnet and the lead). A comparatively larger sensor module may have a higher cost than a comparatively smaller sensor module. Additionally, in an application where physical space in which to arrange the sensor module is limited, a comparatively larger sensor module may be unusable.

In some cases, a similar arrangement (i.e., an arrangement in which the sensing elements face the tooth wheel) can be used for magnetic sensors with sensing elements that can be made to be sensitive to a component of a magnetic field in a direction that is parallel to the main surface of the sensing chip (e.g., magnetoresistive (MR) sensing elements). Such a direction is herein referred to as an in-plane direction. For example, the sensing elements may be sensitive to a component of the magnetic field in a first in-plane direction (e.g., a direction in to and out of the plane of the page in FIG. 1). However, in such a case, the sensing elements suffer from cross-sensitivities to a component of the magnetic field in a second in-plane direction (e.g., a vertical direction parallel to the plane of the page in FIG. 1). Moreover, a linear range of a transfer function associated with such sensing elements is limited. Therefore, in practice, such a solution requires a complex and/or costly magnet design (e.g., a magnet with a pyramid cavity, a magnet with a tilted magnetization, and/or the like). Further, even in a case where the sensing elements offer a comparatively higher linear range (thereby allowing some relaxation on requirements of the magnet), a static magnetic working point must be well controlled, which may be not be readily achievable in such an arrangement.

Some implementations described herein provide a top-read magnetic sensor system that can be used for determining a property of a rotating object (e.g., a rotating object connected to a tooth wheel). In some implementations, a sensor module of the top-read magnetic sensor system has a reduced size as compared to a prior art magnetic sensor systems (e.g., prior art magnetic sensor system 100). Additionally, the sensor module of the top-read magnetic sensor system has a reduced cost as compared to the prior art magnetic sensor systems (e.g., due to the reduced size of the sensor module, the lack of need for a bent lead, the ability to use a simple and low-cost magnet, and/or the like). Further, the sensor module of the top-read magnetic sensor system has a reduced complexity (e.g., in terms of manufacturability, assembly, and/or magnet design) as compared to the prior art magnetic sensor systems. Additional details regarding top-read magnetic sensor systems are described below.

Figure 2A:
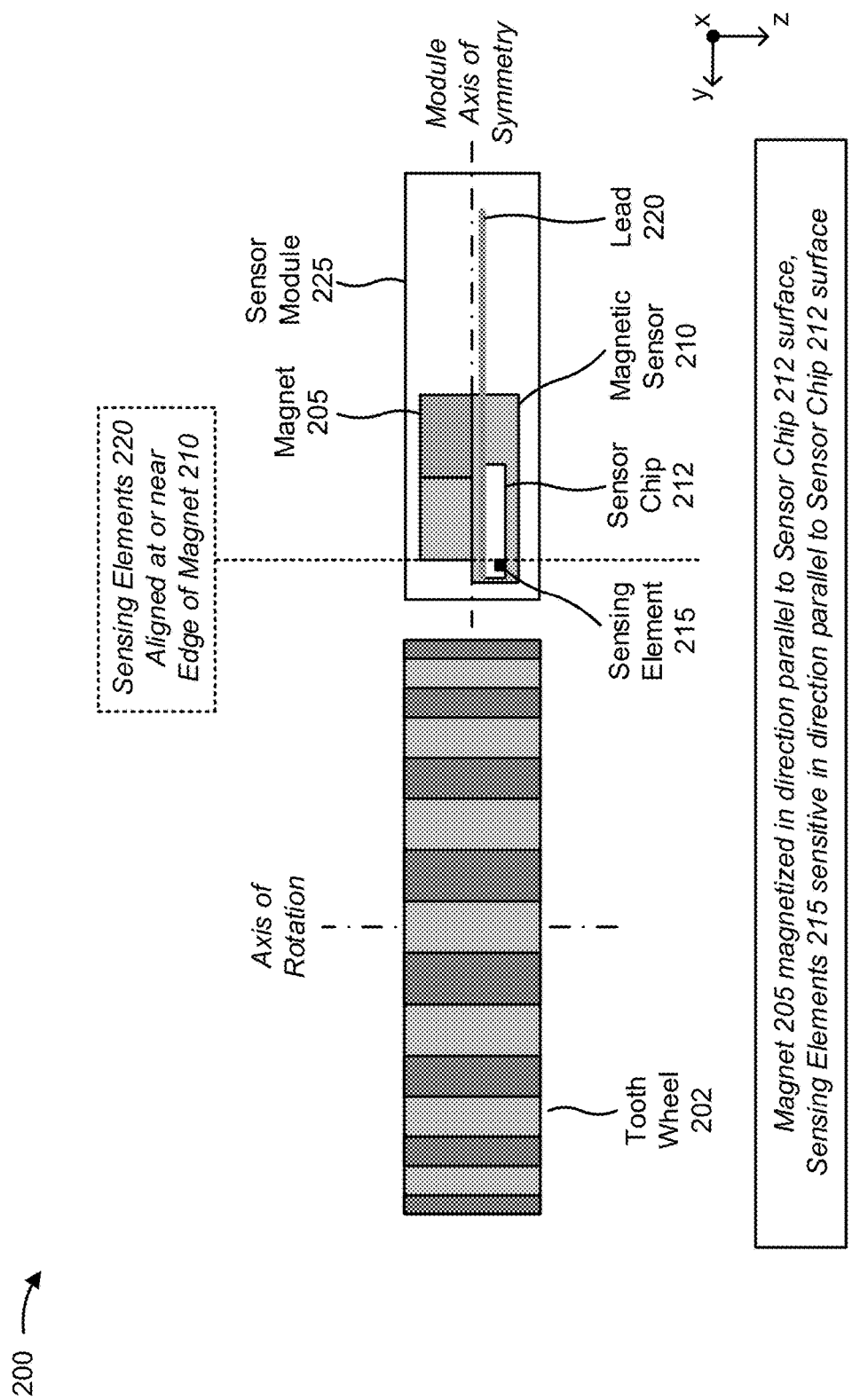

FIGS. 2A-2F are diagrams associated with an example top-read magnetic sensor system 200. FIG. 2A is a top view of top-read magnetic sensor system 200 (e.g., a view in a y-z plane). As shown in FIG. 2A, top-read magnetic sensor system 200 (herein referred to as sensor system 200) may include a tooth wheel 202 and a sensor module 225 that includes a magnet 205, a magnetic sensor 210 (e.g., a sensor package housing a sensor chip 212 with a set of sensing elements 215), and a lead 220 to connect magnetic sensor 210 to a control device (not shown).

Tooth wheel 202 includes a wheel comprising a set of teeth. In some implementations, tooth wheel 202 may, during a rotation, distort a magnetic field of a magnet 205 such that magnetic sensor 210 may sense the distorted magnetic field associated with magnet 205. In some implementations, tooth wheel 202 may be comprised of a ferromagnetic material. In some implementations, tooth wheel 202 may be attached to or coupled to an object for which a rotational speed, a rotational direction, and/or an angular position is to be measured, such as a cylindrical structure (e.g., a crankshaft, a camshaft, a rotating cylinder, a steering column, etc.), a wheel structure (e.g., associated with a tire), an axle (e.g., a vehicle axle), and/or the like.

In some implementations, such as in a crankshaft context, tooth wheel 202 may include a symmetrical tooth wheel, where teeth of tooth wheel 202 have a same width and tooth gaps of tooth wheel 202 have a same width. In some implementations, tooth wheel 202 may include a reference zone (e.g., a comparatively longer tooth or gap) between a pair of teeth of tooth wheel 202. In some implementations, such as in a camshaft context, tooth wheel 202 may include an asymmetrical tooth wheel, where teeth of tooth wheel 202 have varying widths and/or tooth gaps of tooth wheel 202 have varying widths.

Magnet 205 includes a magnet that is configured to bias sensing elements 215 of sensor chip 212. In some implementations, magnet 205 comprises a first half forming a north pole (N) and a second half forming a south pole (S), so that magnet 205 comprises one pole pair. For example, magnet 205 may include a magnet with a north pole on a first half of magnet 205 that is stacked (e.g., along the y-direction) on a south pole on a second half of magnet 205. Additionally, or alternatively, magnet 205 may include a dipole magnet (e.g., a dipole bar magnet, a circular dipole magnet, an elliptical dipole magnet, a cylindrical magnet, etc.), and/or the like. Notably, while magnet 205 is shown as having a rectangular shape in FIG. 2A, magnet 205 may have another shape, such as a square shape, a circular shape, an elliptical shape, a triangular shape, a ring shape, and/or the like. In some implementations, magnet 205 may be comprised of a ferromagnetic material (e.g., isotropic sintered ferrite). In some implementations, magnet 205 may comprise a rare earth magnet.

In some implementations, magnet 205 may be a block magnet with dimensions (e.g., a length, a width, a height, a diameter, a radius, and/or the like) in a range from approximately 2 millimeters (mm) to approximately 15 mm, such as approximately 6 mm. For example, magnet 205 may be a block magnet that measures approximately 6 mm in the x-direction, approximately 7 mm in the y-direction, and approximately 3 mm in the z-direction. In some implementations, magnet 205 may be relatively simple and/or low-cost to manufacture and/or design (e.g., as compared to a magnet composed of a non-ferrous material, a magnet with a pyramid cavity, a magnet with a tilted magnetization, a specially designed magnet, and/or the like), thereby reducing an overall cost and/or complexity of sensor system 200.

In some implementations, magnet 205 may be magnetized in a direction that is parallel to a surface of sensor chip 212 on which sensing elements 215 are arranged. For example, in sensor system 200, magnet 205 may be magnetized along a direction that is substantially parallel to the y-direction.

In some implementations, magnet 205 may be (e.g., mechanically) connected to magnetic sensor 210 such that magnet 205 is arranged symmetrically with respect to sensing elements 215 of sensor chip 212. In other words, magnet 205 may be arranged such that a strength of a given component of a bias magnetic field (e.g., a y-component of a magnetic field), produced by magnet 205, is substantially the same at each sensing element 215 (i.e., such that magnet 205 symmetrically biases sensing elements 215).

Sensor chip 212 includes a component (e.g., an integrated circuit) that provides sensing functionality as described herein. In some implementations, sensor chip 212 includes sensing elements 215 configured to sense an in-plane component (e.g., a component that is substantially parallel to a plane defined by the main surface of sensor chip 212, such as a y-component or an x-component) of a magnetic field present at the sensing elements 215 (e.g., a magnetic field produced by magnet 205). Additional details regarding sensing elements 215 and other components of sensor chip 212 are described below with regard to FIG. 3.

Figure 2B:
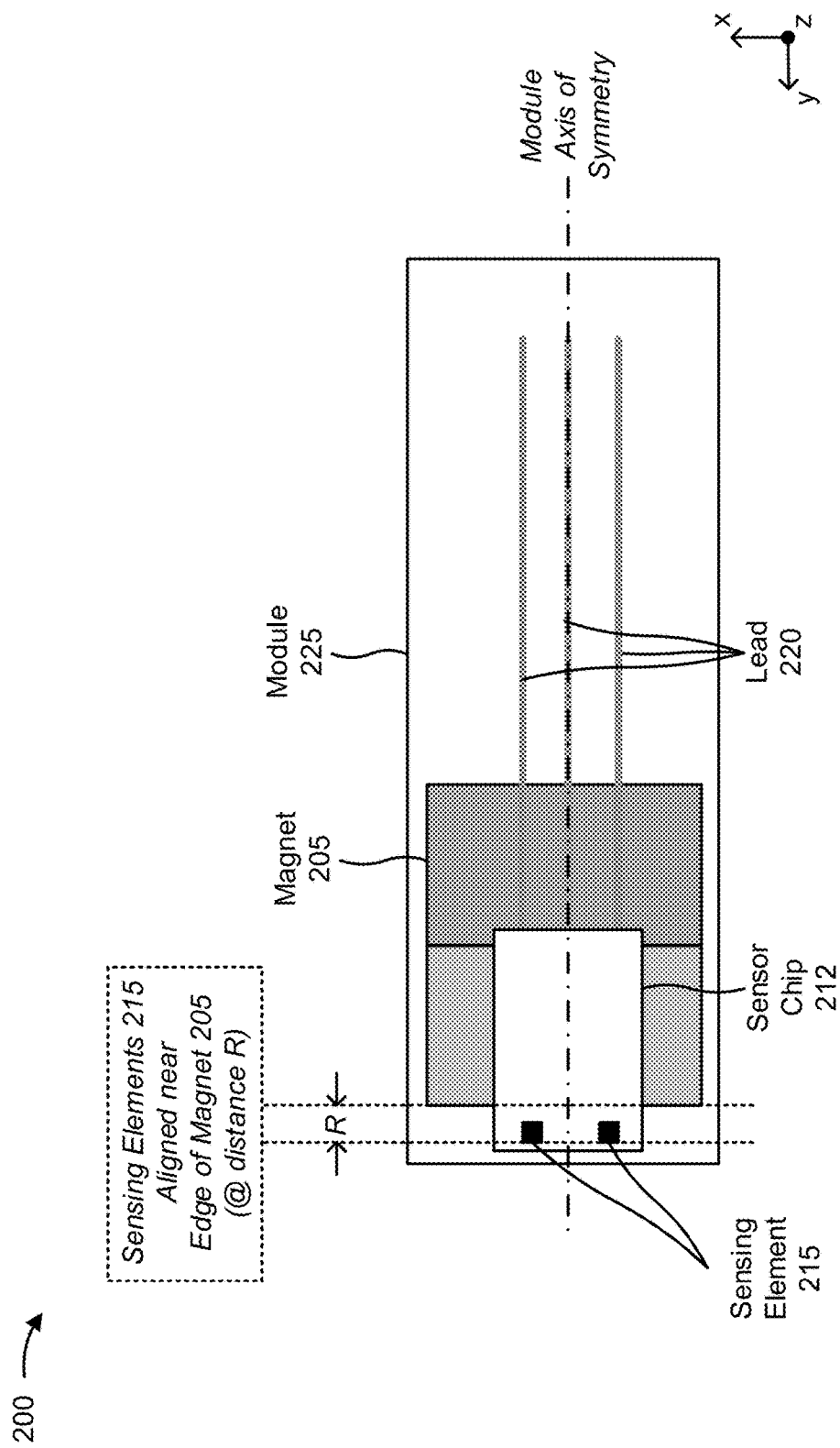

In some implementations, sensor chip 212 may include at least two sensing elements 215, where at least one of the at least two sensing elements 215 is arranged at or near an edge of magnet 205. FIG. 2B is a diagram of a side view of an example sensor system 200 in an x-y plane (with a package of magnetic sensor 210 not shown for purposes of clarity). As shown in FIG. 2B, sensor chip 212 may include a pair of sensing elements 215. In some implementations, sensing elements 215 are sensitive to an in-plane component of the magnetic field (e.g., a y-component or an x-component). In some implementations, sensing elements 215 may be sensitive to the y-component since, in an arrangement such as that shown in FIG. 2B, sensing elements 215 will operate at the same magnetic working point (e.g., both sensing elements 215 will be exposed to the same magnetic field strength $B_y$).

As shown, in some implementations, sensing elements 215 may be positioned at substantially the same position along the y-direction (e.g., at distance R beyond the edge of magnet 205 such that the sensing elements 215 protrude past the edge of magnet 205, adjacent to the edge of magnet 205 at distance R such that the sensing elements 215 protrude past the edge of magnet 205). As further shown, sensing elements 215 may be substantially equidistant from the module axis of symmetry along the x-direction. In some implementations, such an arrangement of sensing elements 215 provides a differential sensing capability, whereby homogenous stray fields are cancelled out due to the differential sensing principle. In some implementations, a pitch between sensing elements 215 in the x-direction may be in a range from approximately 0.8 mm to approximately 3 mm, such as 1.8 mm.

Figure 2C:
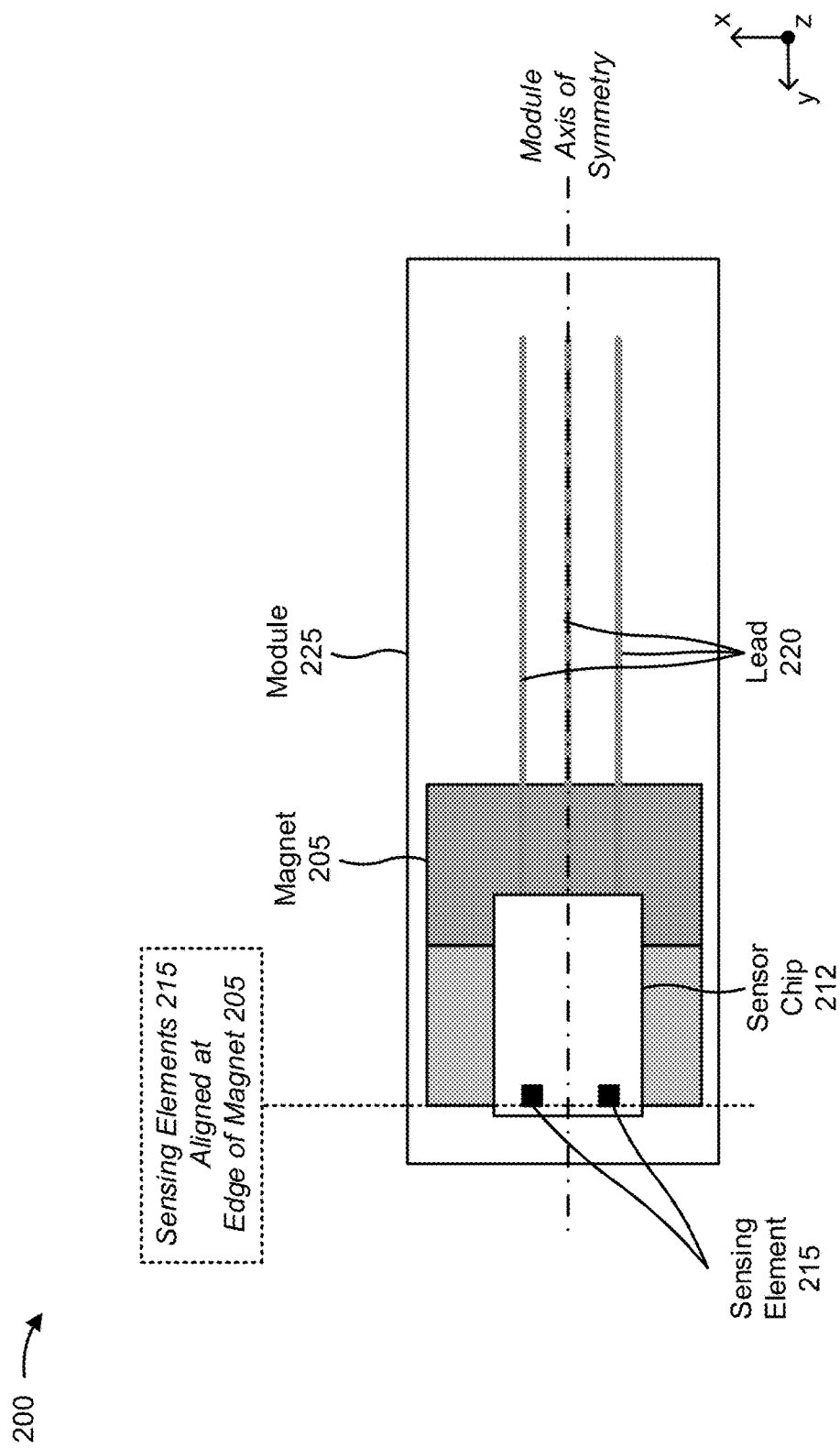

As further shown in FIG. 2B, in some implementations, each sensing element 215 can be aligned near an edge of magnet 205 such that each sensing element 215 is positioned at a distance R (e.g., along the y-direction) beyond the edge of magnet 205 (e.g., adjacent to the edge of magnet 205 such that each sensing elements 215 protrudes past the edge of magnet 205). In some implementations, the distance R may be in arrange from approximately 0 micrometers (μm) to approximately 500 μm, such as approximately 200 μm. Notably, while example distances are provided, the distance R is dependent on design and/or intended use of sensor system 200 and, therefore, other distances may be used in practice. FIG. 2C is a diagram of a side view of an alternative example sensor system 200 in the x-y plane. As shown in FIG. 2C, in some implementations, sensing elements 215 can be substantially aligned at the edge of magnet 205 (e.g., rather than at distance R from the edge of magnet 205).

In some implementations, alignment of sensing elements 215 at the edge of magnet 205 or near the edge of magnet 205 (e.g., at distance R) causes sensing elements 215 to be positioned at or near a zero-crossing region of a y-component of the magnetic field, meaning that sensing elements 215 are exposed to relatively low magnetic working point (e.g., calculated based on $(B_x^2+B_y^2)^{1/2}$, where $B_x$ is a strength of an x-component of the magnetic field and $B_y$ is a strength of the y-component of the magnetic field) as compared to being positioned at a greater distance from the edge of magnet 205. In some implementations, positioning of sensing elements 215 at or near a relatively low magnetic working point allows sensing elements 215 to stay within a usable linear range and avoid saturation, thereby improving performance of sensing elements 215 and, thus, improving accuracy, reliability, and/or the like, of the sensing functionality of magnetic sensor 210. Notably, FIGS. 2B and 2C are provided to illustrate example arrangements of sensing elements 215, and other arrangements are possible.

FIGS. 2D-2F are diagrams illustrating further example arrangements of sensing elements 215 on sensor chip 212. In some implementations, as shown in FIG. 2D, sensor chip 212 may include three sensing elements 215. For example, sensor chip 212 may include sensing element 215-1 and sensing element 215-2, arranged as described above, and may also include sensing element 215-3 arranged between sensing element 215-1 and sensing element 215-2. Here, sensing element 215-3 may be arranged relative to the edge of magnet 205 along the y-direction in a manner similar to sensing element 215-1 and sensing element 215-2, and may be arranged approximately at a midpoint between sensing element 215-1 and sensing element 215-2 along the x-direction.

In some implementations, signals provided by multiple (i.e., two or more) sensing elements 215 may be used in order to calculate a differential signal. For example, with regard to the example shown in FIG. 2D, a signal of sensing element 215-1 may be subtracted from a signal of sensing element 215-2 in order to calculate a differential signal. In some implementations, sensing elements 215 can be connected to a differential amplifier, can be arranged in a Wheatstone bridge configuration, and/or the like, in order to provide this capability. In a case in which such a differential setup is used, homogeneous external disturbance fields (e.g., magnetic stray-fields produced by a source in the vicinity of magnetic sensor 210, such as a coil, a current, and/or the like), will cancel out. This may allow magnetic sensor 210 to reliably and/or accurately operate under harsh conditions, such as those in which a high magnetic stray-field is present (e.g., in a hybrid vehicle, an electric vehicle, and/or the like). In some implementations, sensing element 215-3 (e.g., the additional sensing element 215 not used for the differential calculation) can be used to get additional information, such as a rotational direction of tooth wheel 202 to be signaled by magnetic sensor 210.

FIG. 2E an alternative embodiment of a differential setup of sensing elements 215. In FIG. 2E, a distance between sensing element 215-3 and tooth wheel 202 is smaller than a distance between sensing element 215-6 and tooth wheel 202 (e.g., when magnetic sensor 210 is arranged such that two is to the left of sensor chip 212 with respect to FIG. 2E). Here, since both sensing element 215-3 and sensing element 215-6 are arranged along the same axis and are arranged centrally below the magnet symmetry axis, a strength of a $B_x$ component of the magnetic field at sensing elements 215-3 and 215-6 is approximately equal to zero. Therefore, the magnetic operating point is low. Again, a differential signal can be obtained by connecting sensing element 215-3 and sensing element 215-6 in an appropriate manner (e.g., to a differential amplifier, in a Wheatstone bridge configuration, and/or the like). In some implementations, as shown, sensing element 215-3 and sensing element 215-6 may be positioned at substantially the same position along the x-direction. In some implementations, sensing element 215-3 and/or sensing element 215-6 may be arranged at or beyond the edge of magnet 205.

FIG. 2F is meant to illustrate that a combination of the arrangements of sensing elements 215 depicted in FIGS. 2D and 2E can also be used. Generally, any arbitrary differential (and stray field robust) signal may be obtained by connecting any number of sensor elements 215 in an appropriate manner. For example, using FIG. 2F as an example, a first differential signal may be calculated by based on subtracting a signal provided by sensing element 215-5 from a signal provided by sensing element 215-2, while a second differential signal may be calculated by based on subtracting a signal provided by sensing element 215-4 from a signal provided by sensing element 215-1. Of course, calculation of other differential signals using such an arrangement is possible. In some implementations, such an arrangement provides a functional safety feature in the form of redundancy, monitoring, fail-over, and/or the like.

Returning to FIG. 2A, lead 220 includes a component (e.g., an interconnect, a lead, a lead frame, and/or the like) for connecting sensor chip 212 to, for example, a control device (e.g., a control device associated with controlling a system based on a property of rotating tooth wheel 202). As shown in FIG. 2A, due to the arrangement of sensor chip 212 and magnet 205 in sensor system 200, lead 220 does not need to be bent in order to connect lead 220 to the control device. As such, a cost and/or a complexity of sensor system 200 may be reduced (e.g., as compared to prior art magnetic sensor system 100) since, for example, a processing step for bending lead 220 is not required. In some implementations, the lack of need for a bend in lead 220 also serves to reduce a physical size of sensor module 225, as described below.

Sensor module 225 includes a component that houses magnetic sensor 210 (e.g., including sensor chip 212 with sensing elements 215), magnet 205, and (at least partially) lead 220. In some implementations, sensor module 225 has a reduced size (e.g., as compared to the sensor module of prior art magnetic sensor system 100). For example, since (1) magnet 205 has a relatively small dimension in the z-direction (e.g., as compared to the magnet in prior art magnetic sensor system 100), (2) the main surface of sensor chip 212 is aligned substantially along the module axis of symmetry (e.g., rather than perpendicular to the module axis of symmetry), and (3) no extra space is required for bends of lead 220, sensor module 225 may be made smaller in size than the sensor module of, for example, prior art magnetic sensor system 100. Thus, sensor module 225 may have a comparatively lower cost, may be manufactured at a lower cost, and/or may require less physical space than the sensor module of prior art magnetic sensor system 100. In some implementations, a size (e.g., a diameter, a width, a length, a height, and/or the like) of sensor module 225 may be in a range from approximately 6 mm to approximately 10 mm, such as 8 mm for a diameter of a sensor module 225.

The number and arrangement of components and elements shown in FIGS. 2A-2F are provided as examples. In practice, there may be additional components and/or elements, fewer components and/or elements, different components and/or elements, or differently arranged components and/or elements than those shown in FIGS. 2A-2F. Furthermore, two or more components and/or elements shown in FIGS. 2A-2F may be implemented within a single component and/or elements, or a single component and/or elements shown in FIGS. 2A-2F may be implemented as multiple, distributed components and/or elements. Additionally, or alternatively, a set of components and/or a set of elements (e.g., one or more components and/or one or more elements) of FIGS. 2A-2F may perform one or more functions described as being performed by another set of components or another set of elements of FIGS. 2A-2F.

Figure 3:
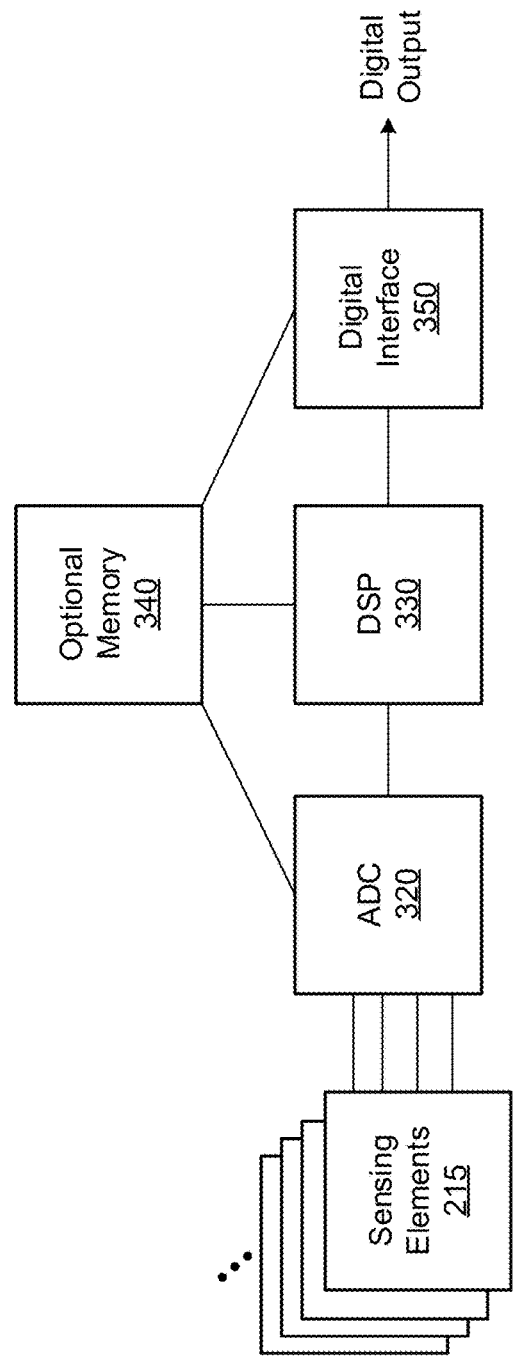
FIG. 3 is a diagram of example components of a sensor chip of the top-read magnetic sensor system.

FIG. 3 is a diagram of example components of sensor chip 212 of top-read magnetic sensor system 200. As shown, sensor chip 212 may include a set of sensing elements 215, an analog-to-digital convertor (ADC) 320, a digital signal processor (DSP) 330, an optional memory element 340, and a digital interface 350.

Sensing element 215 includes an element for sensing an in-plane component of a magnetic field (e.g., a component of the magnetic field that is substantially parallel to the main surface of sensor chip 212, such as a y-component or an x-component) present at sensing element 215. For example, sensing element 215 may include a Hall-based sensing element that operates based on a Hall-effect. As another example, sensing element 215 may include a MR-based sensing element, elements of which are comprised of a magnetoresistive material (e.g., nickel-iron (NiFe)), where the electrical resistance of the magnetoresistive material may depend on a strength and/or a direction of the magnetic field present at the magnetoresistive material. Here, sensing element 215 may operate based on an anisotropic magnetoresistance (AMR) effect, a giant magnetoresistance (GMR) effect, a tunnel magnetoresistance (TMR) effect, and/or the like. As an additional example, sensing element 215 may include a variable reluctance (VR) based sensing element that operates based on induction. In some implementations, sensor chip 212 may include multiple sensing elements 215 (e.g., two or more sensing elements 215) arranged as described above.

In some implementations, one or more sensing elements 215 may be sensitive in a direction that is substantially parallel to a plane defined by a main surface of sensor chip 212 (e.g., an x-direction in sensor system 200, a y-direction in sensor system 200). In some implementations, two or more sensing elements 215 of sensor chip 212 may have a same direction of sensitivity. For example, a first sensing element 215 and a second sensing element 215 may both be sensitive in a same direction (e.g., the y-direction, the x-direction, a direction that is substantially parallel to the plane defined by the surface of sensor chip 212, and/or the like).

ADC 320 may include an analog-to-digital converter that converts an analog signal from sensing elements 215 to a digital signal. For example, ADC 320 may convert analog signals, received from the set of sensing elements 215, into digital signals to be processed by DSP 330. ADC 320 may provide the digital signals to DSP 330. In some implementations, sensor chip 212 may include one or more ADCs 320.

DSP 330 may include a digital signal processing device or a collection of digital signal processing devices. In some implementations, DSP 330 may receive digital signals from ADC 320 and may process the digital signals to form output signals (e.g., destined for a control device to which sensor chip 212 is connected), such as output signals associated with an amount of current measured as passing through a current medium.

Optional memory element 340 may include a read only memory (ROM) (e.g., an EEPROM), a random access memory (RAM), and/or another type of dynamic or static storage device (e.g., a flash memory, a magnetic memory, an optical memory, etc.) that stores information and/or instructions for use by sensor chip 212. In some implementations, optional memory element 340 may store information associated with processing performed by DSP 330. Additionally, or alternatively, optional memory element 340 may store configurational values or parameters for the set of sensing elements 215 and/or information for one or more other elements of sensor chip 212, such as ADC 320 or digital interface 350.

Digital interface 350 may include an interface via which sensor chip 212 may receive and/or provide information from and/or to another device, such as a control device. For example, digital interface 350 may provide the output signal, determined by DSP 330, to the control device and may further receive information from the control device.

The number and arrangement of components and elements shown in FIG. 3 are provided as an example. In practice, sensor chip 212 may include additional components and/or elements, fewer components and/or elements, different components and/or elements, or differently arranged components and/or elements than those shown in FIG. 3. Additionally, or alternatively, a set of components and/or a set of elements (e.g., one or more components or one or more elements) of sensor chip 212 may perform one or more functions described as being performed by another set of components or another set of elements of sensor chip 212.

Figure 4:
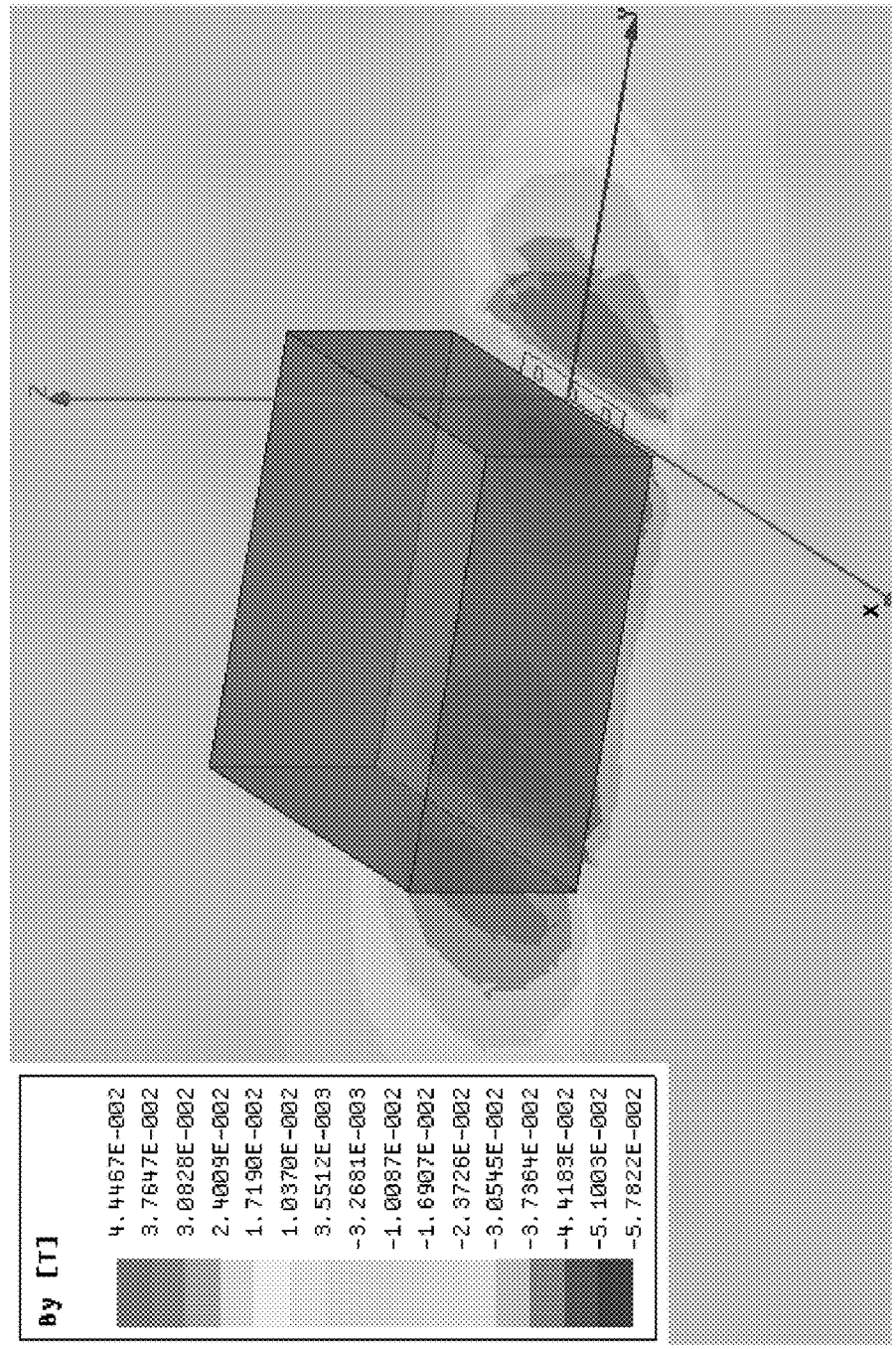
FIG. 4 is a diagram showing an example distribution of a strength of an in-plane component of a magnetic field produced by an example magnet.

FIG. 4 is a diagram of an example distribution 400 of a strength of an in-plane component of a magnetic field produced by an example magnet 205. The distribution 400 shown in FIG. 4 shows a strength of a y-component of the magnetic field produced by an example magnet 205. As shown in FIG. 4, the strength of the y-component at and the near an edge of magnet 205 (e.g., the right edge shown in FIG. 4) is near 0 millitesla (mT). Thus, arranging sensor chip 212 such that sensing elements 215 are positioned at or near this edge of magnet 205 would cause sensing elements 215 to be exposed to a relatively low magnetic working point (e.g., calculated based on $(B_x^2+B_y^2)^{1/2}$) as compared to being positioned at a greater distance from the edge of magnet 205. As described above, positioning of sensing elements 215 at or near a relatively low magnetic working point allows sensing elements 215 to stay within a usable linear range and/or avoid saturation, thereby improving performance of sensing elements 215 and, thus, improving accuracy, reliability, and/or the like, of the sensing functionality of magnetic sensor 210.

As indicated above, FIG. 4 is provided merely as an example. Other examples are possible and may differ from what was described with regard to FIG. 4.

Figure 5:
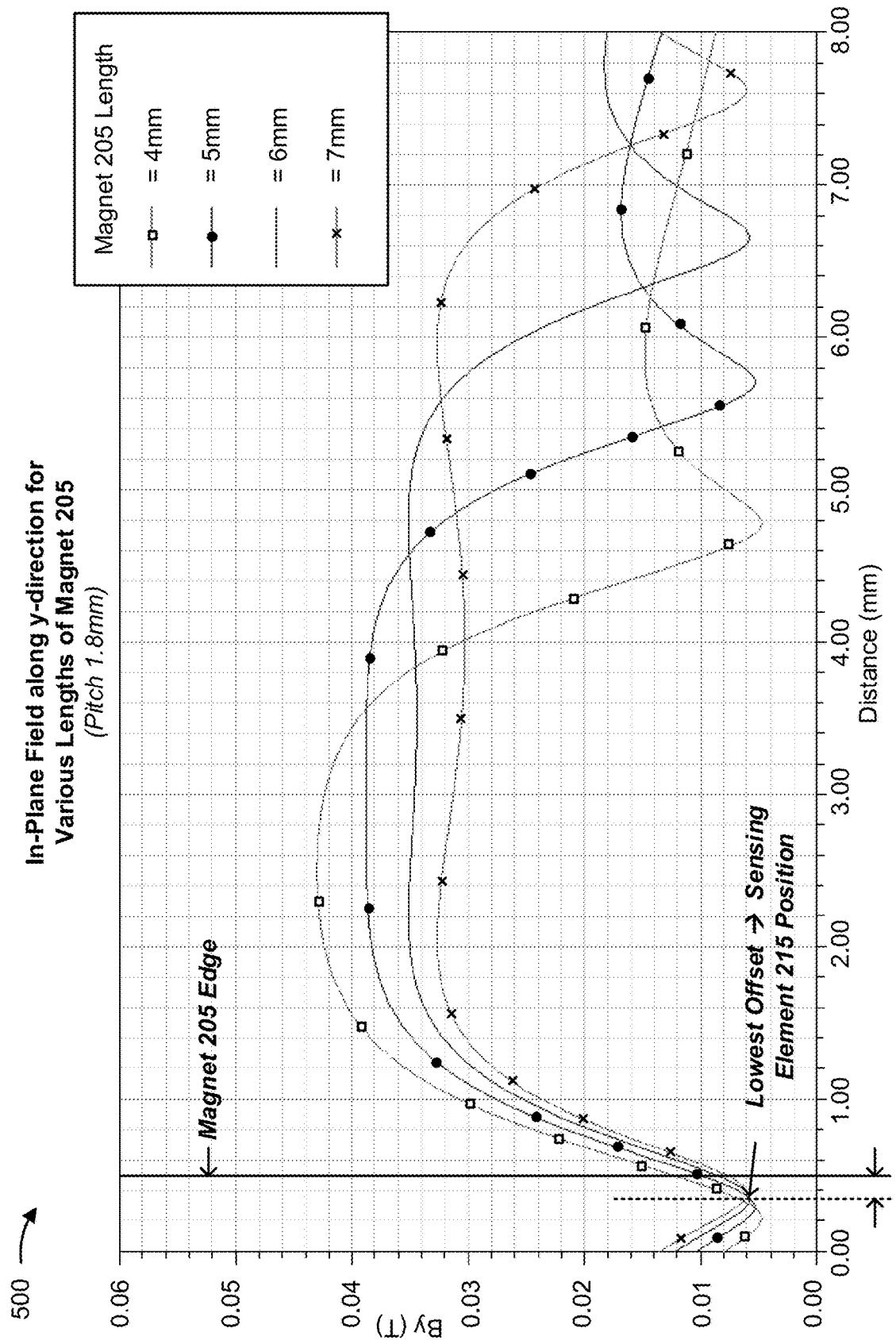
FIG. 5 is a diagram illustrating example positions of sensing elements relative to example magnets with different in-plane lengths.

FIG. 5 is a diagram 500 illustrating example positions of sensing elements 215 relative to example magnets 205 with different in-plane lengths. In FIG. 5, each line corresponds to a different sintered isotropic ferrite magnet 205 with a same width in the x-direction (e.g., 6 mm), but a different length in the y-direction (e.g., 4 mm, 5 mm, 6 mm, and 7 mm).

As shown in FIG. 5, for each example magnet 205, a minimum y-component magnetic field strength ($B_y$) and, thus, the lowest magnetic working point, is just outside of (i.e., adjacent to) an edge of magnet 205. As a particular example, with respect the example magnet 205 with a length of 6 mm, the minimum $B_y$ is approximately 200 μm from the magnet edge. In other words, for the example magnet 205 with length 6 mm, the distance R at which sensing elements 215 may be positioned along the y-direction is approximately equal to 200 μm.

In some implementations, sensing elements 215 may be positioned along the y-direction at substantially a lowest magnetic working point of a magnet 205 used in a given sensor system 200, as described above. In some implementations, positioning sensing elements 215 at substantially the lowest magnetic working point provides tolerance to misalignment since, for example, a small variation of position along the y-direction (relative to the position associated with the lowest magnetic working point) may not significantly impact operation of sensing elements 215.

As indicated above, FIG. 5 is provided merely as an example. Other examples are possible and may differ from what was described with regard to FIG. 5.

Figure 6A:
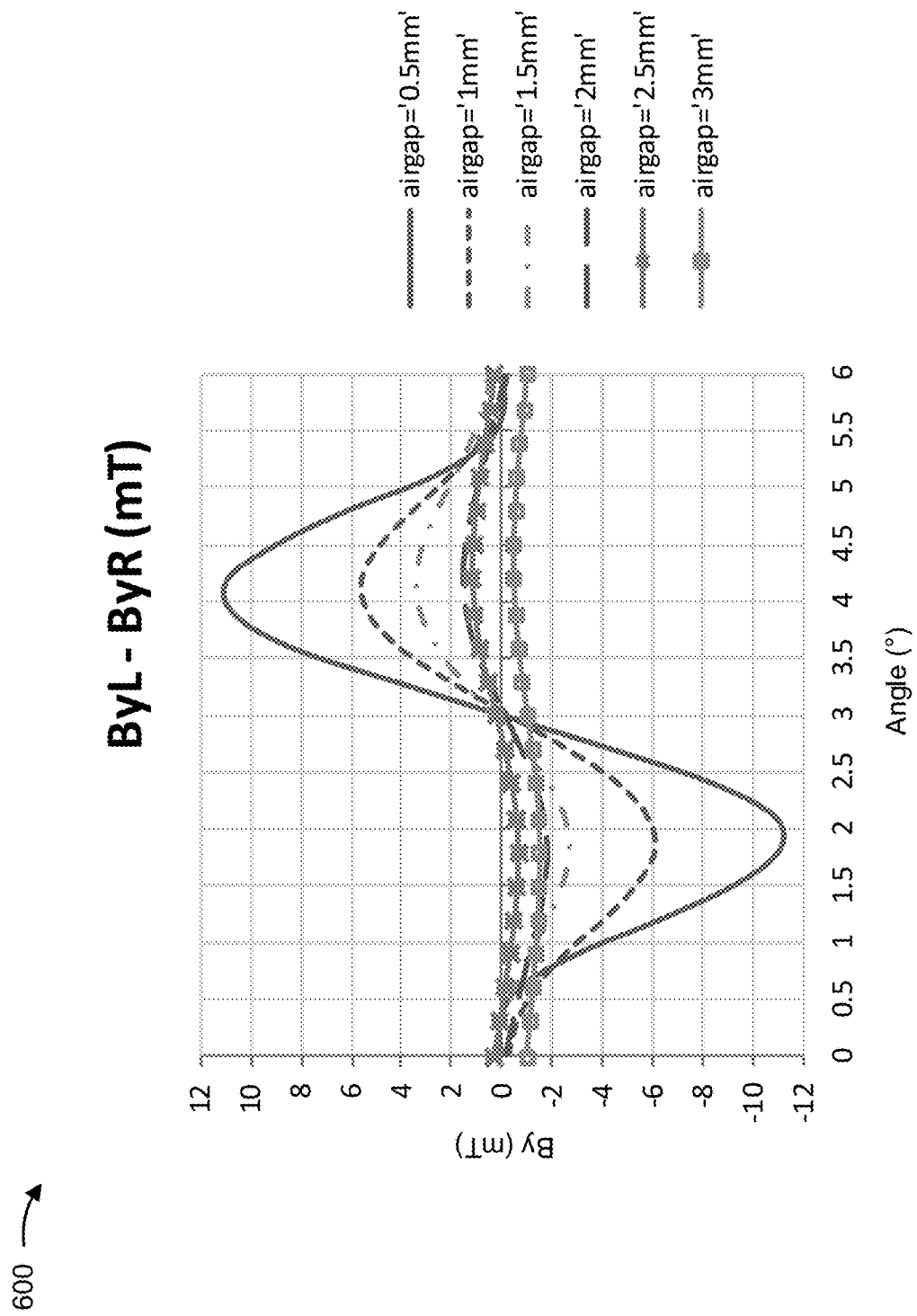
FIGS. 6A and 6B are diagrams showing example results provided by example top-read magnetic sensor systems described herein.
Figure 6B:
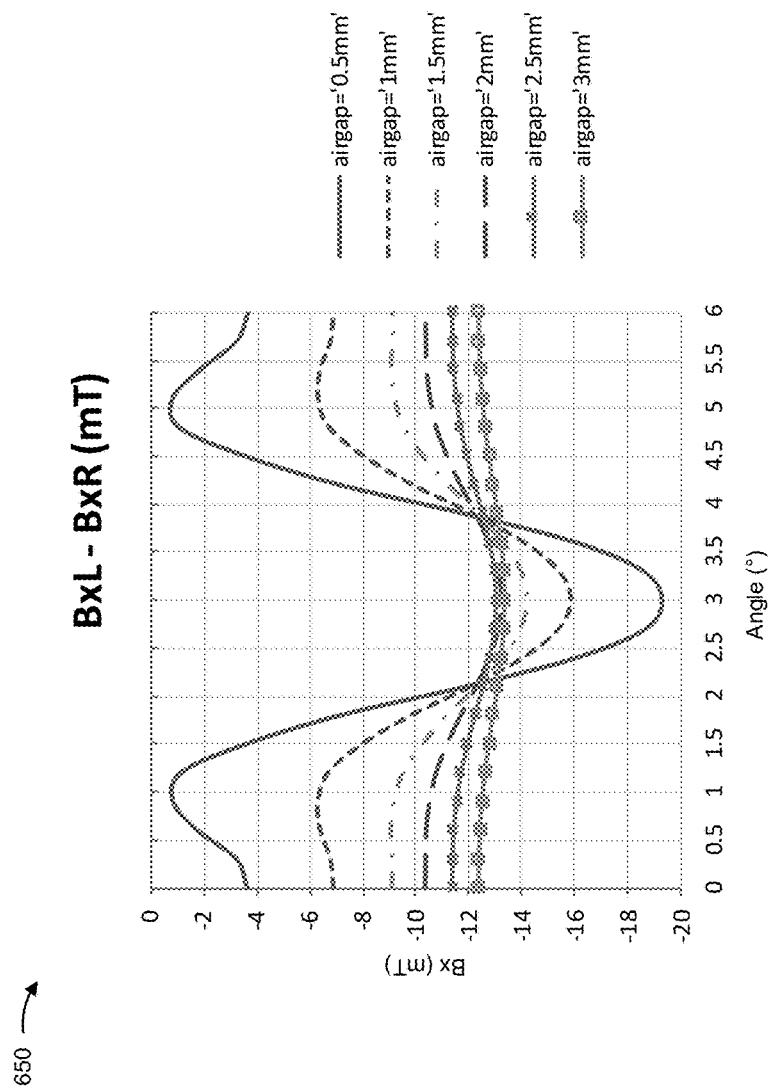

FIGS. 6A and 6B are diagrams 600 and 650, respectively, showing example results provided by example top-read magnetic sensor systems 200 described herein.

FIG. 6A is a diagram associated with a sensor system 200 comprising sensing elements 215 that are sensitive to a component of a magnetic field in a y-direction (e.g., using the reference axes shown in FIG. 2A) for different air gaps (e.g., 0.5 mm, 1.0 mm, 1.5 mm, 2.0 mm, 2.5 mm, and 3.0 mm) between tooth wheel 202 and sensing elements 215. As shown in FIG. 6A, for each of the set of example air gaps, the differential strength of the y-component of the magnetic field (e.g., $B_yL-B_yR$) may vary during rotation of tooth wheel 202 such that an output signal, provided by magnetic sensor 210, can be used to determine a property of tooth wheel 202.

FIG. 6B is a diagram associated with a sensor system 200 comprising sensing elements 215 that are sensitive to a component of a magnetic field in a x-direction (e.g., using the reference axes shown in FIG. 2A) for different air gaps (e.g., 0.5 mm, 1.0 mm, 1.5 mm, 2.0 mm, 2.5 mm, and 3.0 mm) between tooth wheel 202 and sensing elements 215. As shown in FIG. 6B, for each of the set of example air gaps, the differential strength of the x-component of the magnetic field (e.g., $B_xL-B_xR$) may vary during rotation of tooth wheel 202 such that an output signal, provided by magnetic sensor 210, can be used to determine a property of tooth wheel 202.

As indicated above, FIGS. 6A and 6B are provided merely as examples. Other examples are possible and may differ from what was described with regard to FIGS. 6A and 6B.

The above examples are provided as examples, and other implementations are possible (e.g., including one or more additional sensing elements 215, including other combinations of sensing elements 215 with different arrangements, and/or the like).

Some implementations described herein provide a top-read magnetic sensor system 200 that can be used for determining a property of a rotating object (e.g., a rotating object connected to tooth wheel 202). In some implementations, sensor module 225 of top-read magnetic sensor system 200 has a reduced size as compared to a prior art magnetic sensor systems (e.g., prior art magnetic sensor system 100). Additionally, sensor module 225 of top-read magnetic sensor system 200 has a reduced cost as compared to the prior art magnetic sensor systems (e.g., due to the reduced size of sensor module 225, the lack of a need for a bent lead 220, the ability to use a simple and low-cost magnet 205, and/or the like). Further, sensor module 225 of top-read magnetic sensor system 200 has a reduced complexity (e.g., in terms of manufacturability, assembly, and/or magnet design) as compared to the prior art magnetic sensor systems.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A sensor module, comprising:
a magnet with a magnetization in a first direction; and
a sensor chip including a first sensing element and a second sensing element arranged on a plane defined by the sensor chip,
wherein the first direction is substantially parallel to the main surface of the sensor chip,
wherein the first sensing element and the second sensing element are sensitive to an in-plane component of a magnetic field along the first direction or are sensitive to an in-plane component of the magnetic field perpendicular to the first direction, and
wherein the first sensing element and the second sensing element are positioned beyond an edge of the magnet along the first direction such that the first sensing element and the second sensing element protrude past the edge of the magnet along the first direction.

2. The sensor module of claim 1, wherein the first sensing element and the second sensing element are positioned at a substantially same position along the first direction.

3. The sensor module of claim 1, wherein the first sensing element and the second sensing element are positioned a particular distance beyond the edge of the magnet.

4. The sensor module of claim 3, wherein the particular distance is in a range from approximately 0 micrometers (μm) to approximately 500 μm.

5. The sensor module of claim 3, wherein the particular distance is at substantially a lowest magnetic working point associated with the first sensing element and the second sensing element being positioned relative to the magnet.

6. The sensor module of claim 1, wherein the first sensing element and the second sensing element are positioned at a substantially same distance from an axis of symmetry,
wherein the axis of symmetry is parallel to the first direction.

7. The sensor module of claim 1, wherein the sensor chip further comprises a third sensing element arranged on the plane between the first sensing element and the second sensing element,
wherein the first sensing element, the second sensing element, and the third sensing element are positioned at a substantially same position along the first direction.

8. The sensor module of claim 1, wherein the sensor chip further comprises a third sensing element and a fourth sensing element arranged on the plane,
wherein the first sensing element and the second sensing element are positioned at a substantially same first position along the first direction, and
wherein the third sensing element and the fourth sensing element are positioned at a substantially same second position along the first direction,
wherein the first position is different from the second position.

9. The sensor module of claim 1, wherein the first sensing element and the second sensing element are sensitive to a component of the magnetic field along the first direction.

10. The sensor module of claim 1, wherein the magnet comprises a permanent magnet.

11. The sensor module of claim 1, wherein the first sensing element and the second sensing element are positioned at different positions along the first direction.

12. A sensor module, comprising:
a magnet with a magnetization in a first direction; and
a sensor chip including a first sensing element and a second sensing element arranged on a plane defined by the sensor chip,
wherein the first direction is substantially parallel to the plane defined by the sensor chip,
wherein the first sensing element and the second sensing element are sensitive to a component of a magnetic field along the first direction or are sensitive to a component of the magnetic field along a second direction that is substantially parallel to the plane defined by the sensor chip,
wherein the second direction is substantially perpendicular to the first direction, and
wherein at least one of the first sensing element or the second sensing element is positioned at or adjacent to an edge of the magnet along the first direction such that the first sensing element or the second sensing element protrudes past the edge of the magnet along the first direction.

13. The sensor module of claim 12, wherein the first sensing element and the second sensing element are positioned at a substantially same position along the first direction.

14. The sensor module of claim 12, wherein the first sensing element and the second sensing element are positioned beyond the edge of the magnet.

15. The sensor module of claim 12, wherein the first sensing element and the second sensing element are positioned beyond the edge of the magnet is at substantially a lowest magnetic working point associated with the first sensing element and the second sensing element.

16. The sensor module of claim 12, wherein the first sensing element and the second sensing element are positioned at a substantially same distance from an axis of symmetry along the second direction.

17. The sensor module of claim 12, wherein the first sensing element and the second sensing element are positioned at different positions along the first direction and at a substantially same position along the second direction.

18. The sensor module of claim 12, wherein the sensor chip further comprises a third sensing element arranged on the plane between the first sensing element and the second sensing element.

19. A sensor system, comprising:
   a magnetic sensor including a sensor chip with a plurality of sensing elements arranged on a plane defined by the sensor chip,
      wherein each of the plurality of sensing elements is sensitive to a component of a magnetic field along a first direction or is sensitive to a component of the magnetic field along a second direction,
         wherein the first direction and the second direction are substantially parallel to the plane defined by the sensor chip, and
         wherein the first direction is substantially perpendicular to the second direction, and
      wherein at least one of the plurality of sensing elements is to be positioned adjacent to an edge of a magnet, associated with the sensor system, along the first direction such that the at least one sensing element protrudes past the edge of the magnet along the first direction.

20. The sensor system of claim 19, wherein the at least one sensing element and another sensing element, of the plurality of sensing elements, are positioned at a substantially same position along the first direction.

* * * * *